United States Patent
Kakarla et al.

(10) Patent No.: US 9,069,619 B2
(45) Date of Patent: Jun. 30, 2015

(54) SELF-TESTABLE HA FRAMEWORK LIBRARY INFRASTRUCTURE

(75) Inventors: Sarat B. Kakarla, Sunnyvale, CA (US); Andrey Gusev, Dublin, CA (US); Juan Tellez, Piedmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 704 days.

(21) Appl. No.: 12/688,735

(22) Filed: Jan. 15, 2010

(65) Prior Publication Data

US 2011/0179428 A1 Jul. 21, 2011

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/50 | (2006.01) |
| G06F 11/36 | (2006.01) |

(52) U.S. Cl.
CPC .......... *G06F 9/5061* (2013.01); *G06F 11/3672* (2013.01); *G06F 2209/505* (2013.01)

(58) Field of Classification Search
CPC .................................................... G06F 9/5061
USPC ......................................................... 719/328
See application file for complete search history.

(56) References Cited

U.S. PATENT DOCUMENTS

| | | | |
|---|---|---|---|
| 6,154,849 A | 11/2000 | Xia | |
| 6,308,163 B1 | 10/2001 | Du et al. | |
| 6,393,485 B1 | 5/2002 | Chao et al. | |
| 6,516,350 B1 | 2/2003 | Lumelsky et al. | |
| 6,594,779 B1 | 7/2003 | Chandra et al. | |
| 6,782,408 B1 | 8/2004 | Chandra et al. | |
| 6,931,640 B2 | 8/2005 | Asano et al. | |
| 6,990,666 B2 | 1/2006 | Hirschfeld et al. | |
| 7,281,045 B2 | 10/2007 | Aggarwal et al. | |
| 7,340,578 B1 | 3/2008 | Khanzode | |
| 7,383,383 B1 | 6/2008 | Bandopadhyay et al. | |
| 7,392,421 B1 | 6/2008 | Bloomstein et al. | |
| 7,451,201 B2 | 11/2008 | Alex et al. | |
| 7,464,147 B1 | 12/2008 | Fakhouri et al. | |
| 7,480,281 B2 | 1/2009 | Hare et al. | |
| 7,484,223 B2 | 1/2009 | Hill et al. | |
| 7,581,224 B2 | 8/2009 | Romero | |
| 7,827,302 B2 | 11/2010 | Weinert et al. | |
| 7,904,756 B2 | 3/2011 | Dilman et al. | |
| 8,020,034 B1 | 9/2011 | Shrivastava et al. | |

(Continued)

OTHER PUBLICATIONS

Microsoft Computer Dictionary, 2002, Microsoft Press, 5th edition, 3 pages.*

(Continued)

*Primary Examiner* — Timothy A Mudrick
(74) *Attorney, Agent, or Firm* — Hickman Palermo Becker Bingham LLP

(57) ABSTRACT

A method for a self-testing clusterware agent is provided. A clusterware agent that includes clusterware-side components and application-side components is configured to interface between a cluster manager and an application. The application-side components are invoked by clusterware-side components via an application programming interface, or API that includes API functions that are invocable by a cluster manager. Without any cluster manager invoking the clusterware agent, one or more of the API functions are invoked.

16 Claims, 3 Drawing Sheets

(56) References Cited

U.S. PATENT DOCUMENTS

| | | | |
|---|---|---|---|
| 8,103,635 B2 | 1/2012 | Lee et al. | |
| 8,154,554 B1 | 4/2012 | Brown et al. | |
| 8,180,864 B2 | 5/2012 | Ghattu | |
| 8,180,922 B2 | 5/2012 | Dini et al. | |
| 8,364,648 B1 | 1/2013 | Sim-Tang | |
| 8,364,726 B2 | 1/2013 | Georgiev | |
| 8,429,450 B2 | 4/2013 | Brown et al. | |
| 8,543,862 B2 | 9/2013 | Dilman et al. | |
| 2002/0087665 A1 | 7/2002 | Marshall et al. | |
| 2002/0120744 A1 | 8/2002 | Chellis et al. | |
| 2002/0124085 A1 | 9/2002 | Matsuda et al. | |
| 2002/0198984 A1 | 12/2002 | Goldstein et al. | |
| 2002/0198996 A1 | 12/2002 | Sreenivasan et al. | |
| 2003/0126240 A1 | 7/2003 | Vosseler | |
| 2004/0226025 A1 | 11/2004 | Beaudoin et al. | |
| 2005/0177628 A1 | 8/2005 | Victoria et al. | |
| 2005/0188283 A1 | 8/2005 | Pomaranski et al. | |
| 2005/0198275 A1 | 9/2005 | D'Alo et al. | |
| 2005/0234931 A1 | 10/2005 | Yip et al. | |
| 2006/0047813 A1 | 3/2006 | Aggarwal et al. | |
| 2006/0053410 A1 | 3/2006 | Charisius et al. | |
| 2006/0163338 A1 | 7/2006 | Allen et al. | |
| 2006/0195448 A1 | 8/2006 | Newport | |
| 2006/0206860 A1 | 9/2006 | Dardinski | |
| 2007/0168965 A1 | 7/2007 | Zenz et al. | |
| 2007/0174101 A1 | 7/2007 | Li et al. | |
| 2008/0021917 A1 | 1/2008 | Baker et al. | |
| 2008/0052719 A1 | 2/2008 | Briscoe et al. | |
| 2008/0141261 A1 | 6/2008 | Machida | |
| 2008/0209397 A1 | 8/2008 | Mohindra et al. | |
| 2008/0222642 A1* | 9/2008 | Kakarla et al. | 718/104 |
| 2008/0312982 A1 | 12/2008 | Braun et al. | |
| 2008/0320460 A1 | 12/2008 | Miller et al. | |
| 2009/0006888 A1 | 1/2009 | Bernhard et al. | |
| 2009/0037367 A1 | 2/2009 | Wein | |
| 2009/0043809 A1 | 2/2009 | Fakhouri et al. | |
| 2009/0054140 A1 | 2/2009 | Beser et al. | |
| 2009/0125751 A1 | 5/2009 | Dawson et al. | |
| 2009/0172668 A1 | 7/2009 | Bobak et al. | |
| 2009/0222540 A1 | 9/2009 | Mishra et al. | |
| 2009/0290483 A1* | 11/2009 | Curtis et al. | 370/216 |
| 2009/0328024 A1 | 12/2009 | Li et al. | |
| 2010/0064009 A1 | 3/2010 | Chen et al. | |
| 2010/0107172 A1 | 4/2010 | Calinescu et al. | |
| 2010/0161290 A1 | 6/2010 | Duchenay et al. | |
| 2010/0241896 A1 | 9/2010 | Brown | |
| 2010/0257535 A1 | 10/2010 | Badovinatz et al. | |
| 2010/0332659 A1 | 12/2010 | Marowsky-Bree et al. | |
| 2011/0119681 A1 | 5/2011 | Spencer et al. | |
| 2011/0125895 A1 | 5/2011 | Anderson et al. | |
| 2011/0145392 A1 | 6/2011 | Dawson et al. | |
| 2011/0179169 A1 | 7/2011 | Gusev et al. | |
| 2011/0179170 A1 | 7/2011 | Gusev et al. | |
| 2011/0179171 A1 | 7/2011 | Gusev et al. | |
| 2012/0226788 A1 | 9/2012 | Jackson | |
| 2013/0024728 A1 | 1/2013 | Lee et al. | |
| 2014/0149783 A1 | 5/2014 | Georgiev | |

OTHER PUBLICATIONS

Strohm, Richard, "Oracle Clusterware Adminstration and Deployment Guide", 11g Release 1 (11.1), dated Sep. 2007, 180 pages.

Strohm, Richard, "Oracle Clusterware Adminstration and Deployment Guide", 11g Release 1 (11.2), dated Aug. 2009, 322 pages.

* cited by examiner

SELF-TESTABLE HA FRAMEWORK LIBRARY INFRASTRUCTURE

CROSS-REFERENCE TO RELATED APPLICATIONS

Benefit Claim

This application is related to the following applications: (1) application Ser. No. 12/688,710, entitled "Special Values In Oracle Clusterware Resource Profiles," filed on Jan. 15, 2010, the entire contents of which is hereby incorporated by reference as if fully set forth herein; (2) application Ser. No. 12/688,715, entitled "'Local Resource' Type As A Way To Automate Management Of Infrastructure Resources In Oracle Clusterware," filed on Jan. 15, 2010, the entire contents of which is hereby incorporated by reference as if fully set forth herein; (3) application Ser. No. 12/688,723, entitled "Unidirectional Resource and Type Dependencies In Oracle Clusterware," filed on Jan. 15, 2010, the entire contents of which is hereby incorporated by reference as if fully set forth herein; (4) application Ser. No. 12/688,800, entitled "Conditional Dependency in a Computing Cluster", filed on Jan. 15, 2010, the entire contents of which is hereby incorporated by reference as if fully set forth herein; (5) application Ser. No. 12/688,739, entitled "Dependency On A Resource Type", filed on Jan. 15, 2010, the entire contents of which is hereby incorporated by reference as if fully set forth herein; (6) application Ser. No. 12/688,769, entitled "Dispersion Dependency In Oracle Clusterware," filed on Jan. 15, 2010, the entire contents of which is hereby incorporated by reference as if fully set forth herein. The applicants hereby rescind any disclaimer of claim scope in the related applications.

FIELD OF THE INVENTION

The present invention relates generally to clusterware systems. More specifically, the present invention relates to a self-testable framework library infrastructure for clusterware agents.

BACKGROUND

Clusterware

Clusterware is a general term that refers to a software product that is used to combine a set of nodes into a single entity, all members working together as a logical unit. A node may be a computer interconnected to other computers, or a server blade interconnected to other server blades in a grid. The single entity is referred to as a cluster or computer cluster. Clusterware allows this cluster to be controlled as a unit. For example, five nodes may be combined into a cluster, each node with its own combination of applications that may be supported by the cluster as a whole. An example of an application that may be installed on some or each of the nodes is a database management system (DBMS) such as those produced by Oracle Corporation, 500 Oracle Parkway, Redwood Shores Calif. Applications may be clusterware-aware (sometimes referred to as clusterware-enabled) and controllable by clusterware. These applications are designed to be deployed and managed using clusterware. Other applications may also be controlled by clusterware.

Clusterware may be implemented as middleware, residing between the operating system and any applications. Clusterware may also be implemented as part of the operating system. A cluster manager, or a node with management authority, manages the resources and services of a cluster according to policy specifications.

Clusterware Services

Services such as membership services are provided by the clusterware. Membership determines which computers or nodes are parts of the cluster, and which other servers can be substituted for the failed server in the cluster.

Resource management is another service provided by clusterware. Resource management techniques may vary with each clusterware product. In some implementations, clusterware considers everything it manages to be a resource, and what clusterware knows about each resource is defined in a resource profile for that resource. A resource may be anything that the clusterware manages, and may include any physical or logical entity that an application is comprised of, or uses to be able to provide services. Anything a resource depends upon may also be considered a resource. Physical entities may include hardware resources such as network cards, CPU, and memory. Logical entities may include resources such as IP addresses, applications, and processes such as daemons. Resources may depend on other resources, creating a hierarchy of resources. For example, a web server application is a resource that depends on an IP address, which is another resource.

To manage a resource means to direct resources and perform activities related to that resource. These activities may, for example, cause the resource to behave or be provisioned in a particular manner. Resource management includes placement and defining operability of resources within the cluster, including bringing resources online and taking them offline, as well as monitoring each resource. For example, putting an Internet Protocol (IP) address in the proper configuration location for a web server is a way of managing an IP address, while restarting the web server is a way of managing the web server. By managing the resources, the cluster manager is able to insure the availability of resources in an environment requiring high availability of services. This is sometimes referred to as HA (high availability) resource management.

In some implementations, the resource profile controls what the clusterware will do when managing the resource. A resource profile is a collection of attributes having values that define the properties of the resource associated with the value. The attributes and properties may be made up of common or generic attributes and properties, or may be application specific. For example, if the resource crashes, the resource profile defines whether or not the particular resource, given the particular circumstance, will be restarted. As another example, if the resource keeps crashing, it may be relocated to another node in the cluster based on the configuration in the resource profile. Resource profiles may be grouped together to make up a logical group of profiles. This logical group of resource profiles is sometimes referred to as an HA (high availability) policy.

Clusterware may also be used to manage resource relationships, such as resource dependencies. In some implementations, resource dependencies may be expressed as an attribute in a resource profile, defining dependencies between resources. For example, if a web server application is moved from one node to another, an IP address must be provisioned at the node to which the web server application is being moved. If the web server application depends on a particular IP address, that particular IP address must be moved before the web server application will function properly.

Clusterware Agents

Clusterware may use clusterware agents to assist in resource management activities. An agent is software comprising components of software modules that are invocable by other software modules that perform various actions on the applications or resources that manage the agent. Although a computing device actually performs agent functions pursuant to the instructions associated with software modules, it is more convenient to describe software modules as performing this functionality. There is no need to obfuscate the invention by defining the role of a computing device with respect to each particular function being performed, as the software modules themselves adequately define this role.

Agents may have application or client-side components that are specific to the application and clusterware or server-side components that support the generic clusterware interface, with an Application Programming Interface (API) connecting the two sides. Application-side components are provided by the agent developer, and comprise application-specific code modules that interface with the application for which the agent was created to manage. Clusterware-side components are provided by the clusterware manufacturer, and provide a generic interface capable of interacting with the clusterware manager. The API provides a means for the developer of the application-side components to interface with the generic clusterware-side components.

An agent framework, acting as an intermediary, receive messages from the clusterware, and performs various application specific actions by invoking the application-side components, or application-specific code. Additionally, the application-side components may receive information from the application such as resource state information that describes the state of the resource. This application-specific code determines, at the agent, what a particular clusterware message means for the particular application. For example, an application may need to save data in order to shut down gracefully. Therefore, a "stop" command generated by the clusterware may result in the agent asking the application to save data, followed by a command that causes the application to cease processing.

To test a clusterware agent, it has been a requirement that the agent be connected to a cluster manager. This is because the cluster manager generates the clusterware-specific messages that are provided to agents. However, setting up a development environment to test clusterware agents can be costly, time-consuming, and ineffective. The expertise required to set up a clusterware system is often not part of the skill set of the clusterware agent developers, because the clusterware agent developers often develop the code to manage the application deployed under clusterware using the generic clusterware-side interface of the clusterware agent, and are unfamiliar with clusterware system administration. Therefore, a clusterware engineer is required to set up and monitor any testing system. As this is often not an available option for clusterware agent developers, clusterware agents are often deployed with inadequate real testing. In addition, testing clusterware agents against an actual clusterware system often fails to allow some relevant scenarios to be tested. This leads to unreliable results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a clusterware agent executes on a computer. The clusterware agent is configured to interface between a cluster manager and an application. The clusterware manager executes clusterware. The clusterware agent includes clusterware-side components and application-side components. The application-side components are invoked by clusterware-side components via an application programming interface, or API. The API includes API functions that are invocable by a cluster manager executing clusterware. Without any cluster manager invoking the clusterware agent, one or more of the API functions are invoked.

In another embodiment, the invocation of the API functions causes one or more application-side components to request that the application perform one or more operations associated with said one or more API functions.

In another embodiment, the clusterware-side components include a self testing engine, which is a software component that generates clusterware-side messages associated with one or more API functions.

Structural and Functional Overview

Figure 1:
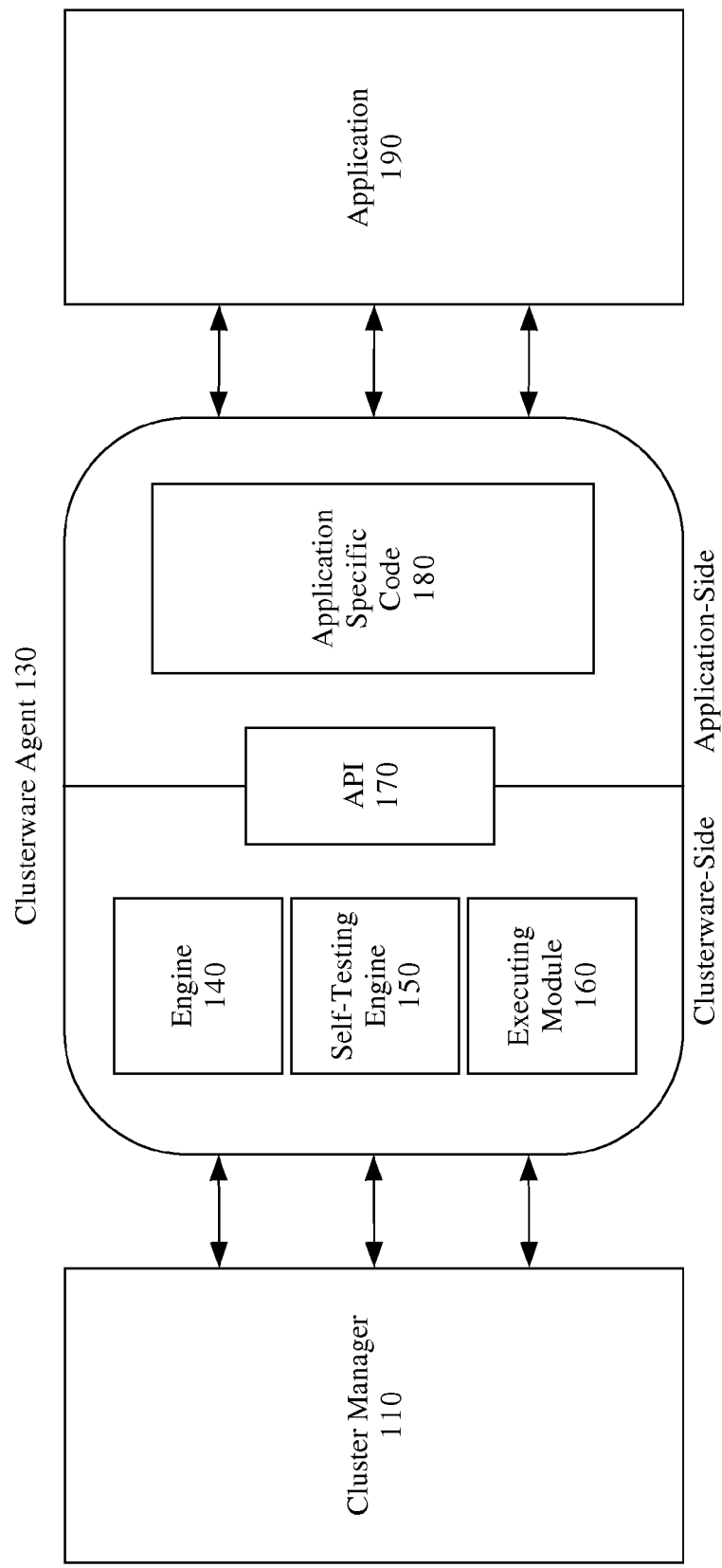
FIG. 1 is a block diagram illustrating an architecture on which an embodiment may be implemented.

FIG. 1 is a block diagram that illustrates an architecture on which an embodiment may be implemented. Cluster manager 110 may be communicatively coupled to clusterware agent 130. In an embodiment, cluster manager 110 is not coupled in any way to clusterware agent 130.

Clusterware agent 130 includes clusterware-side components and application-side components. Clusterware-side components include engine 140, self-testing engine 150, and executing module 160. Application-side components include application specific code module 180. The clusterware-side components and application-side components are connected via an application programming interface (API) 170. Clusterware agent 130 is communicatively coupled to application 190.

Cluster manager 110 is a designation given to the node that manages the cluster. The cluster manager 110 may be a node within the cluster. Cluster manager 110 manages resources based on policies stored in policy profiles associated with resources.

Clusterware agent 130 functions as an interface between application 190 and cluster manager 110. Clusterware agent 130 has application-side components that are specific to the application and clusterware-side components, which are programmed by the application developer, that support the generic cluster manager 110 interface, with an API 170 connecting the two sides. Engine 140 manages the clusterware-side components, and determines the flow of information within the clusterware-side of the clusterware agent 130. Self-testing engine 150 emulates cluster manager 110, and is capable of sending messages to API 170 to application-side components. Self-testing engine 150 includes an interface that an application developer may use to send instructions to the self-testing engine 150.

The application specific code 180 provides functions that interface with API 170. The functions define the actions that should be taken when messages are received from clusterware-side components. Application specific code 180 also provides functions that define actions to be taken when messages are received from application 190. The application specific code 180 portion of a clusterware agent is different for each application 190. For example, a "stop" message from the cluster manager may invoke a particular set of procedures for one application, while another application may require a different set of procedures to honor the same message.

Agent Development Utility

An agent development utility is a platform for development of clusterware agents 130. Usually, an agent development utility is provided by the creator of the clusterware-side components of the clusterware agent 130 and the clusterware manufacturer. Providing a development utility to agent developers allows clusterware agents 130 to be created using libraries that form the clusterware-side components. Developers are relieved from the burden of programming against the cluster manager 110, and instead program against an API 170.

The agent framework contains the libraries required to compile, into the clusterware agent, engine 140, self-testing engine 150, and executing module 160, along with API 170. Additionally, the development utility compiles any application specific code 180 and other modules to create an executable clusterware agent 130. Application specific code 180 compiled using the agent development utility allows the application developer to provide optimized application startup, checking, stopping, and management.

The application-specific code 180 is written to manage any application that is installed on a node. The application 190 need not be running for a clusterware agent 130 to manage the application 190. Therefore, there is no limit to the number or type of application that may be managed by clusterware through the use of an agent.

Self-Testing Engine

A cluster manager 110 and a self-testing engine 150 are shown in the embodiment depicted in FIG. 1. Clusterware relies on the cluster manager 110 to make decisions regarding the management of resources. Resource management by the cluster manager 110 is based on resource profile information associated with each individual resource.

For example, a resource profile for a web server may direct the cluster manager 110 to restart the web server upon receiving status information that indicates that the web server is unresponsive. Based on other information, such as the length of time the web server has been unresponsive, the profile may indicate that the shutdown should not be a graceful shutdown, but a "hard" shutdown.

Not all clusterware agent developers have ready access to clusterware. This is because clusterware takes a significant amount of time, resources, and money to install and manage. Instead, developers that create agents are familiar with the application for which they are designing an agent. For example, a developer for a database management system (DBMS) may be intimately familiar with the inner-workings of the DBMS, but he may know nothing about clusterware system management. Based on this scenario, the developer may be proficient at writing the application specific code 180 associated with his application 190, but may have no way of testing the code if he lacks a cluster manager 110 to send messages to his agent.

A self-testing engine 150 moves the message generation function of the cluster manager 110 into the clusterware agent 130. The self-testing engine 150 is a clusterware-side component of the clusterware agent 130 that emulates the cluster manager 110 for testing purposes. This means that the self-testing engine 150 is capable of sending clusterware-side messages to API 170. These messages, such as start, stop, check, and clean messages, result in API 170 calls to application specific code 180 that defines the meaning of each message for the application. There is no limit to the number of messages that may be supported by the self-testing engine 150. The self-testing engine 150 is also not limited to particular types of messages. Any message that may be supported by clusterware may be supported by the self-testing engine 150.

For example, the application specific code 180 on the clusterware-side of a clusterware agent 130 associated with an Apache Web Server application may receive a "start" command that was generated by the self-testing engine 150 on the clusterware side of the clusterware agent 130 and delivered to the application specific code 180 via API 170. The application specific code 180 may translate the "start" command into "apachectl-k start" in order to cause the Apache Web Server instance to start. The application specific code 180 may translate the "start" command into "apachectl-k stop" or "apachectl-k graceful" in order to cause the Apache Web Server instance to stop, depending on whether the agent developer wants the process to end abruptly or gracefully. Application specific code 180 may be simple, like the Apache Web Server example shown here, or may include any number of functions that perform multiple distinct operations. For example, application specific code 180 may require that certain information, such as state information, be written to a log before an application is stopped.

In an embodiment, all requests are queued up at the agent by a queuing module. The queuing module is a clusterware-side component that manages the flow of commands into the self-testing engine 150. This ensures that emulation of the cluster manager 110 is authentic, as the cluster manager 110 provides a guarantee that only a single action is invoked on a resource at any given time, with exceptions. One exception, for example, is when an action is meant to abort another action. This behavior is consistent with the operation of the self-testing engine 150.

Test Module Interface

In an embodiment, the self-testing engine 150 includes a test module interface. In another embodiment, a test module interface functions as a separate logical clusterware-side unit from the self-testing engine 150 that interfaces with test policy unit 150. The purpose of the test module interface is to allow clusterware agent developers to develop test units designed to provide instructions to the self-testing engine 150. The self-testing engine 150 carries out the instructions by generating clusterware-side messages based on the instructions in the test unit. Instructions are created by the agent developer, and compiled into the agent using the agent development utility. Instructions may be included in a header file or other portion of code that is accessible to the agent development utility.

These instructions are designed by the agent developer to simulate a specific scenario. The scenario defined by a test unit may be configured to replicate a normal execution path, a known error-causing scenario, or any combination scenarios for which the ability of the agent to cope with the scenario is unknown. For example, during operation in a production environment decisions may be made by the cluster manager 110 with respect to the many resources (including applications) that are managed by the cluster manager 110. Unexpected changes in the state of the system, such as a network card disk failure or the instability of a process, may cause the clusterware agent 130 to encounter circumstances that require the clusterware agent 130 to handle a situation for which testing was not performed. In a production environment such situations are difficult to test for because simulating the exact sequence of events that may cause an error requires that the clusterware cooperate with the scenario. Achieving such cooperation is difficult.

The test module interface provides a layer between test units and the self-testing engine 150. A test unit provides instructions to the self-testing engine 150 that indicate a series of management functions to invoke with respect to the application 190. More than one test unit may be defined, and a group of test units may be stored within an array of test units. The following listing is an example of an array containing two test units:

```
BEGIN_TEST_ARRAY
    TEST_1
        ADD_RES [R1]
        START_RES [R1]
        STOP_RES [R1]
    END_OF_TEST_1
    TEST_2
        ADD_RES [R2]
        START_RES [R2]
        CHECK_RES [R2]
        START_RES [R2]
        STOP_RES [R2]
        CLEAN_RES [R2]
    END_OF_TEST_2
END_TEST_ARRAY
```

Although the example listing above recites a particular syntax, other embodiments may use any syntax available to convey the commands to the self-testing engine 150. For example, test units may be written in extensible markup language (XML) or any other convenient way of expressing commands.

In the example listing above, the first test unit and the second test unit are encapsulated in an array. The first test unit is referred to as "TEST_1," while the second test unit is referred to as "TEST_2." The first test unit instructs the self-testing engine 150 to add the resource known as "R1," start the resource, and then stop the resource. The second test unit instructs the self-testing engine 150 to add the resource known as "R2," start the resource, check the resource, start the resource again, stop the resource, and then clean the resource.

A portion of the second test unit will cause the agent to try to start the resource two times without a stop command between the two start commands. This scenario may or may not cause undesirable side effects. Regardless of the effects on the application 190, the clusterware agent developer may use this testing framework to determine whether or not the clusterware agent 130 is capable of functioning properly after a given scenario. What it means to function properly is application specific, and may be determined by the application developer. However, common themes in this determination include verifying that the clusterware agent 130 is able to control, recover, and gather state information from the application 190. In addition, the clusterware agent 130 should not fail in any way. For example, it would be undesirable for the clusterware agent 130 to "hang" or become unresponsive.

It is important to test as many scenarios as possible before deploying a clusterware agent 130 in a production environment. The test module interface to the self-testing engine 150 simplifies the ability to test all possible scenarios without the clusterware agent 130 interacting with a cluster manager 110. Messages that may be issued by a cluster manager 110 may be replicated by the self-testing engine 150 by creating a test unit that specifies those commands. Furthermore, any permutation that uses the set of available commands may be tested using this test framework. Likewise, a series of tests may be performed by calling the associated test units in order, or all test units in the array of tests may be invoked.

The ability to test permutations of commands is particularly significant because commands that result in successful application management functions when run alone will not necessarily result in the same success when run in conjunction with other commands, or multiple times in a row. The same is true for a series of commands: a particular series of commands, such as "start, stop, clean" may result in a favorable performance without the interference of other commands. However, when the series is placed after a start command, resulting in "start, start, stop, clean," it is possible that the two start commands in a row may result in unfavorable or inconsistent performance. The cluster manager 110 makes decisions that are correct based on the information available to the cluster manager 110 at the time, but the correctness of the decision may quickly become outdated. For example, the cluster manager 110 may be aware that a DBMS is available, and therefore able to accept management-related messages and act on them. However, by the time the message is generated by the cluster manager 110 and received by the node running the DBMS, the DBMS may have failed. As a practical matter, simulating this event in a development environment is very difficult, but specifying a series of commands, while taking into consideration a known state, using a self-testing clusterware agent 130 simplifies the test for this scenario. For example, a test cluster manager 110 may be configured to send a request to a DBMS, even if the DBMS is known to be unavailable, in order to test the agent's ability to handle any resulting failure by detecting problems and correctly reporting errors. Since any permutation of commands may be delivered to the clusterware agent 150 after a clusterware agent 150 is deployed, testing as many permutations as possible is desirable.

In an embodiment, to invoke a clusterware agent 150 in test mode, the agent may be executed using a command line command with a switch. For example, if the clusterware agent 150 is named "apacheagent," the following command may be used to execute the agent in "test mode," thereby invoking one or more test units:

apacheagent-t

Additional switches may be used to specify individual test units. Specifying individual test units may be useful if an agent is compiled with more than one test unit, and each test unit is designed to test the functionality of a particular version of the application 190. For example, the following command may be used to execute the agent in "test mode" while invoking the more specific test unit named TEST_2:

apacheagent-t-TEST_2

Logging and Debugging

In an embodiment, clusterware-side components include a logging module that reports errors associated with actions. In a complex system, it is common for failures to occur. For example, a problem may frequently occur at startup time for a particular application. If that particular application only fails some of the time, it may be difficult to detect the particular series of actions taken with respect to that resource that cause the failure. By frequently testing multiple possible permutations and logging failures, patterns may become apparent to the developer.

Agent startup related problems are particularly troublesome when a self-testing agent 130 is not used. This is because a debugger can only be attached in a clusterware system after the clusterware agent 130 is already running because the startup of the agent is controlled by the clusterware, not the developer. If a problem occurs before the debugger is attached, the problem will go unnoticed by the debugger. With a self-testing clusterware agent 130, the agent can be executed right out of the debugger. This provides the ability to have the debugger attached from the first instruction.

Example Flow

Figure 2:
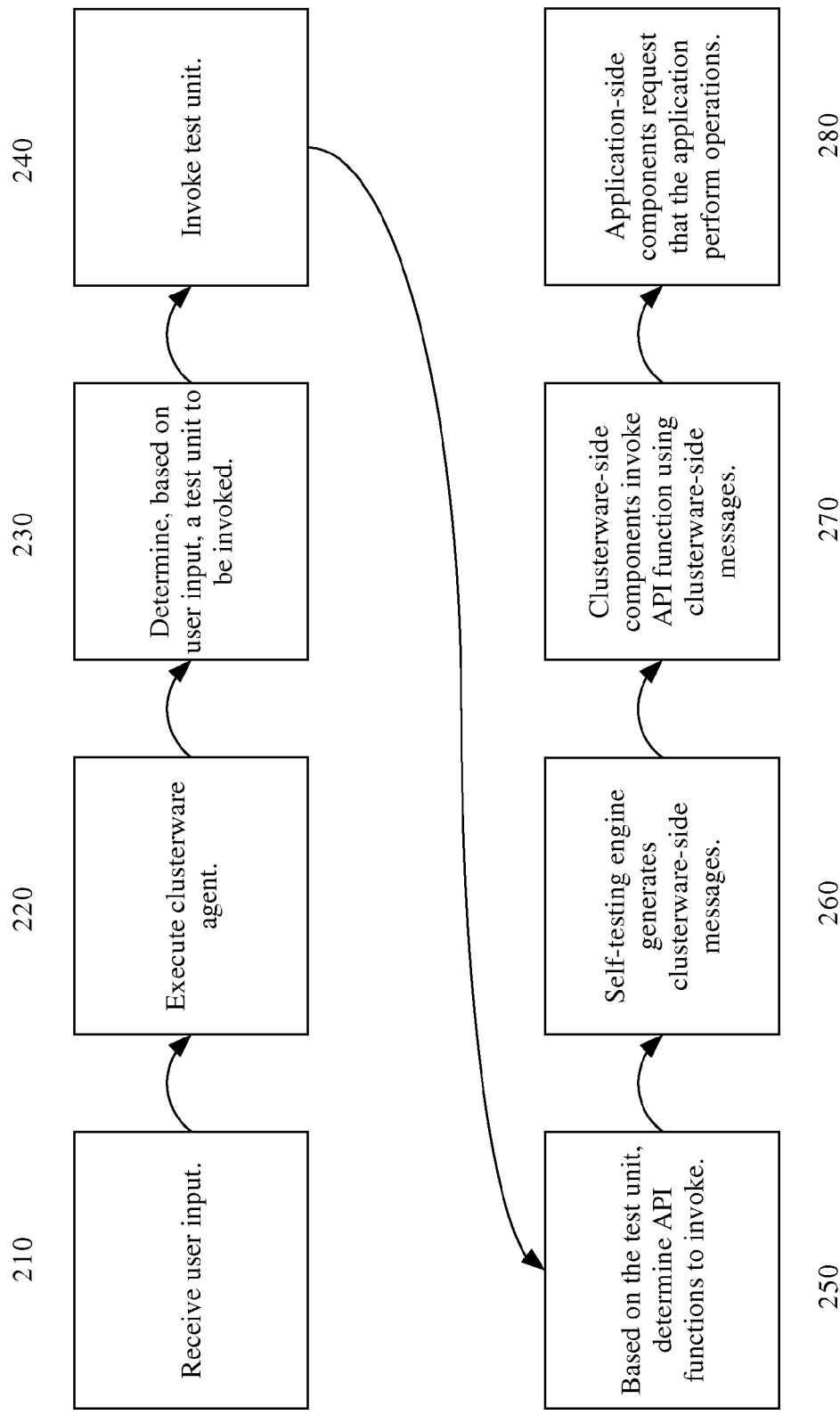
FIG. 2 is a flow diagram illustrating an embodiment.

FIG. 2 is a flow diagram illustrating an embodiment. At step 210, user input is received. At step 220, a clusterware agent 150 is executed. At step 230, a test unit to be invoked is determined based on the user input. At step 240, the test unit is invoked. At step 250, based on the test unit, API functions to invoke are determined. At step 260, the self-testing engine generates clusterware-side messages. At step 270, clusterware-side components invoke the API functions using the clusterware-side messages. At step 280, application-side components request that the application perform operations associated with the API function calls.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
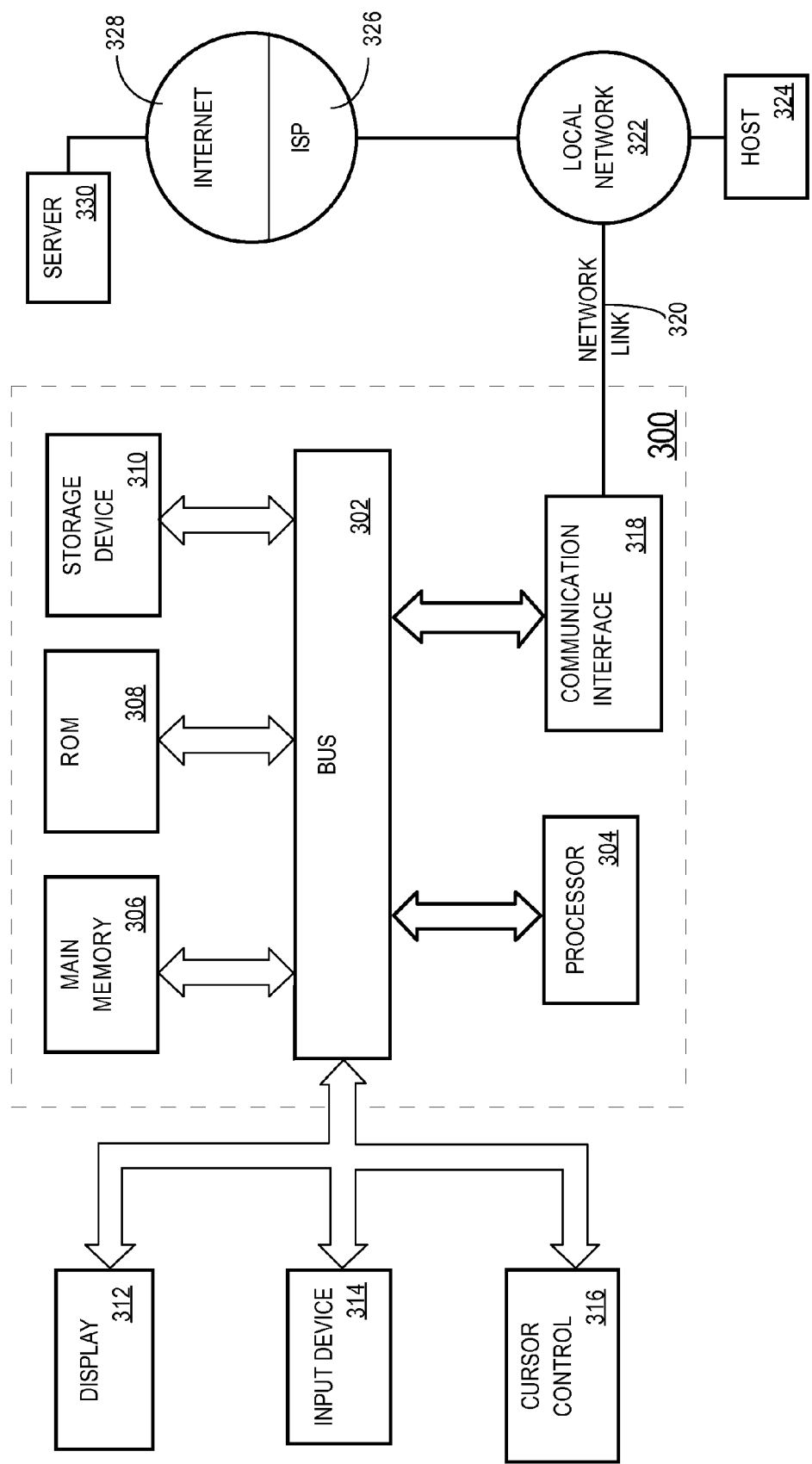
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for testing a clusterware agent configured to communicate between an application and a cluster manager executing clusterware, the method comprising:
    executing on a computer said clusterware agent,
        wherein said clusterware agent comprises clusterware-side components and application-side components, and
    wherein a given cluster manager manages resources and services of the cluster by invoking clusterware-side components that communicate via an Application Programming Interface (API) with application-side components that communicate with said application; and emulating a behavior of said given cluster manager by one or more clusterware-side components by:
        determining one or more API functions to invoke based, at least in part, on a test unit, wherein the test unit is embedded within said clusterware agent, and the test unit is designed to cause an application failure;
        determining one or more clusterware-side messages for invoking said one or more API functions; and
        invoking said one or more API functions of said API by using said clusterware-side messages;
    wherein said method is performed by one or more computing devices.

2. The method of claim 1, wherein the step of invoking said one or more API functions includes requesting that said application perform one or more operations associated with said one or more API functions.

3. The method of claim 1,
    wherein the clusterware-side components include a self-testing engine; and
    wherein the self-testing engine generates clusterware-side messages for invoking said one or more API functions.

4. The method of claim 1, further comprising determining said one or more test units to be used to invoke API functions based, at least in part, on user input received as an argument associated with invocation of the agent.

5. The method of claim 1, further comprising:
    receiving application state information from said application, wherein said application state information specifies a behavior of the application; and
    based at least in part on said application state information, sending a state message to the clusterware-side components without sending said state message to any cluster manager.

6. The method of claim 1, wherein said one or more API functions include at least one of: start; stop; check; and clean.

7. The method of claim 1, further comprising:
    executing, on a computer, said clusterware agent; and
    invoking said clusterware agent by a cluster manager.

8. The method of claim 1, wherein said computer on which said clusterware agent is executed is a node of a computer cluster.

9. A computer-readable storage medium storing instructions for testing a clusterware agent configured to communicate between an application and a cluster manager executing clusterware, which, when executed, cause one or more processors to perform:
- executing on a computer a clusterware agent,
  - wherein said clusterware agent comprises clusterware-side components and application-side components, and
  - wherein a given cluster manager invokes clusterware-side components that communicate via an Application Programming Interface (API) with application-side components that communicate with said application; and
- emulating a behavior of said given cluster manager by one or more clusterware-side components, by:
  - determining one or more API functions to invoke based, at least in part, on a test unit, wherein the test unit is embedded within said clusterware agent, and the test unit is designed to cause an application failure;
  - determining one or more clusterware-side messages for invoking said one or more API functions; and
  - invoking said one or more API functions by using said clusterware-side messages.

10. The computer-readable storage medium of claim 9, wherein invoking said one or more API functions includes requesting that said application perform one or more operations associated with said one or more API functions.

11. The computer-readable storage medium of claim 9,
- wherein the clusterware-side components include a self-testing engine, and
- wherein the instructions when executed by the one or more processors further cause the self-testing engine to generate clusterware-side messages for invoking said one or more API functions.

12. The computer-readable storage medium of claim 9,
- wherein the instructions further include instructions for determining said one or more test units to be used to invoke API functions based, at least in part, on user input received as an argument associated with the invocation of the agent.

13. The computer-readable storage medium of claim 9, wherein the instructions further include instructions for:
- receiving application state information from said application, wherein said application state information specifies a behavior of the application; and
- based at least in part on said application state information, sending a state message to the clusterware-side components without sending said state message to any cluster manager.

14. The computer-readable storage medium of claim 9, wherein said one or more API functions include at least one of: start; stop; check; and clean.

15. The computer-readable storage medium of claim 9, wherein the instructions further include instructions for:
- executing, on a computer, said clusterware agent; and
- invoking said clusterware agent by a cluster manager.

16. The computer-readable storage medium of claim 9, wherein said computer on which said clusterware agent is executed is a node of a computer cluster.

* * * * *

UNITED STATES PATENT AND TRADEMARK OFFICE
CERTIFICATE OF CORRECTION

| | |
|---|---|
| PATENT NO. | : 9,069,619 B2 |
| APPLICATION NO. | : 12/688735 |
| DATED | : June 30, 2015 |
| INVENTOR(S) | : Kakarla et al. |

Page 1 of 1

It is certified that error appears in the above-identified patent and that said Letters Patent is hereby corrected as shown below:

ON THE TITLE PAGE

On page 2, column 2, under Other Publications, line 1, delete "Adminstration" and insert -- Administration --, therefor.

On page 2, column 2, under Other Publications, line 3, delete "Adminstration" and insert -- Administration --, therefor.

IN THE CLAIMS

In column 14, line 9, in Claim 12, after "with" delete "the".

Signed and Sealed this
Eighth Day of March, 2016

Michelle K. Lee
*Director of the United States Patent and Trademark Office*